US012252128B2

(12) United States Patent
Kawakita et al.

(10) Patent No.: US 12,252,128 B2
(45) Date of Patent: Mar. 18, 2025

(54) TRAJECTORY GENERATION DEVICE, TRAJECTORY GENERATION METHOD, AND COMPUTER PROGRAM PRODUCT

(71) Applicant: DENSO CORPORATION, Kariya (JP)

(72) Inventors: Kouji Kawakita, Kariya (JP); Keigo Fujimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 242 days.

(21) Appl. No.: 17/814,624

(22) Filed: Jul. 25, 2022

(65) Prior Publication Data
US 2022/0355799 A1 Nov. 10, 2022

Related U.S. Application Data

(63) Continuation of application No. PCT/JP2020/046064, filed on Dec. 10, 2020.

(30) Foreign Application Priority Data

Feb. 3, 2020 (JP) .................. 2020-016458

(51) Int. Cl.
*B60W 30/18* (2012.01)
*B60W 30/14* (2006.01)
*B60W 40/04* (2006.01)
*B60W 60/00* (2020.01)

(52) U.S. Cl.
CPC .... *B60W 30/18163* (2013.01); *B60W 30/143* (2013.01); *B60W 40/04* (2013.01); *B60W 60/001* (2020.02); *B60W 2554/4041* (2020.02)

(58) Field of Classification Search
None
See application file for complete search history.

(56) References Cited

U.S. PATENT DOCUMENTS

| | | | |
|---|---|---|---|
| 2016/0225261 A1* | 8/2016 | Matsumoto | G08G 1/167 |
| 2018/0017971 A1* | 1/2018 | Di Cairano | B62D 15/0265 |
| 2018/0201271 A1* | 7/2018 | Ishioka | B60W 10/04 |
| 2019/0276027 A1* | 9/2019 | Toda | B60W 40/04 |
| 2019/0278280 A1* | 9/2019 | Imai | B60W 30/09 |
| 2019/0359209 A1 | 11/2019 | Mizutani et al. | |
| 2020/0079379 A1* | 3/2020 | Mimura | B60W 10/04 |
| 2021/0061282 A1* | 3/2021 | Jafari Tafti | G05D 1/0088 |
| 2022/0204053 A1* | 6/2022 | Taniguchi | B60W 40/114 |

* cited by examiner

Primary Examiner — James J Lee
Assistant Examiner — Melanie G Huber
(74) Attorney, Agent, or Firm — Maschoff Brennan

(57) ABSTRACT

A trajectory generation device configured to generate a branch trajectory as a trajectory of a first vehicle traveling from a main lane to a branch lane includes a determination unit and an adjustment unit. The determination unit is configured to determine whether a second vehicle different from the first vehicle is present in the branch lane. The adjustment unit is configured to adjust a sharpness of the branch trajectory based. The branch trajectory in a scene where it is determined that the second vehicle is present in the branch lane is a branch following trajectory. The branch trajectory in a scene where it is determined that the second vehicle is not present in the branch lane is a branch release trajectory. The branch release trajectory guides the first vehicle to the branch lane less sharply than the branch following trajectory.

22 Claims, 14 Drawing Sheets

TRAJECTORY GENERATION DEVICE, TRAJECTORY GENERATION METHOD, AND COMPUTER PROGRAM PRODUCT

CROSS REFERENCE TO RELATED APPLICATION

The present application is a continuation application of International Patent Application No. PCT/JP2020/046064 filed on Dec. 10, 2020, which designated the U.S. and claims the benefit of priority from Japanese Patent Application No. 2020-016458 filed on Feb. 3, 2020. The entire disclosures of all of the above applications are incorporated herein by reference.

TECHNICAL FIELD

The present disclosure relates to a trajectory generation technique for generating a trajectory of a vehicle.

BACKGROUND

A trajectory generation technique to generate a trajectory of a vehicle traveling from a main lane to a branch lane is known. This technique makes it possible to generate a trajectory according to the shape of the road from the vicinity of the entry point to the branch lane.

SUMMARY

A first aspect of the present disclosure is a trajectory generation device configured to generate a branch trajectory as a trajectory of a first vehicle traveling from a main lane to a branch lane. The trajectory generation device includes a determination unit configured to determine whether a second vehicle different from the first vehicle is present in the branch lane; an adjustment unit configured to adjust a sharpness of the branch trajectory based on whether the second vehicle is present in the branch lane. The branch trajectory in a scene where it is determined that the second vehicle is present in the branch lane is a branch following trajectory which causes the first vehicle to follow the second vehicle. The branch trajectory in a scene where it is determined that the second vehicle is not present in the branch lane is a branch release trajectory which releases the first vehicle from the following to the second vehicle. The adjustment unit is configured to generate the branch release trajectory that guides the first vehicle to the branch lane less sharply than the branch following trajectory.

A second aspect of the present disclosure is a method for a processor to generate a branch trajectory as a trajectory of a first vehicle traveling from a main lane to a branch lane. The method includes determining whether a second vehicle different from the first vehicle is present in the branch lane; and adjusting a sharpness of the branch trajectory based on whether the second vehicle is present in the branch lane. The branch trajectory in a scene where it is determined that the second vehicle is present in the branch lane is a branch following trajectory which causes the first vehicle to follow the second vehicle. The branch trajectory in a scene where it is determined that the second vehicle is not present in the branch lane is a branch release trajectory which releases the first vehicle from the following to the second vehicle. The branch release trajectory guides the first vehicle to the branch lane less sharply than the branch following trajectory.

A third aspect of the present disclosure is a computer program product for generating a branch trajectory as a trajectory of a first vehicle traveling from a main lane to a branch lane. The computer program product is stored on at least one non-transitory computer readable medium and includes instructions configured to, when executed by at least one processor, cause the at least one processor to: determine whether a second vehicle different from the first vehicle is present in the branch lane; and adjust a sharpness of the branch trajectory based on whether the second vehicle is present in the branch lane. The branch trajectory in a scene where it is determined that the second vehicle is present in the branch lane is a branch following trajectory which causes the first vehicle to follow the second vehicle. The branch trajectory in a scene where it is determined that the second vehicle is not present in the branch lane is a branch release trajectory which releases the first vehicle from the following to the second vehicle. The branch release trajectory guides the first vehicle to the branch lane less sharply than the branch following trajectory.

EMBODIMENTS

In a connection lane of the branch lane which is connected to the main lane to extend along the main lane, the trajectory is curved from the main lane in the lateral direction. Accordingly, the trajectory in the vicinity of the entrance to the branch lane is formed to be along the shape of the branch lane, and the trajectory tends to give a large change in the lateral direction to the vehicle. Such a large change in the lateral direction may cause a lateral acceleration or a yaw rate in the behavior of the vehicle.

It may be assumed to generate a trajectory with small change in the lateral direction. However, the trajectory with small change in the lateral direction cause an interference with other vehicles which stops in the branch lane due to a traffic jam, for example.

Hereinafter, an embodiment will be described with reference to the drawings.

Figure 1:
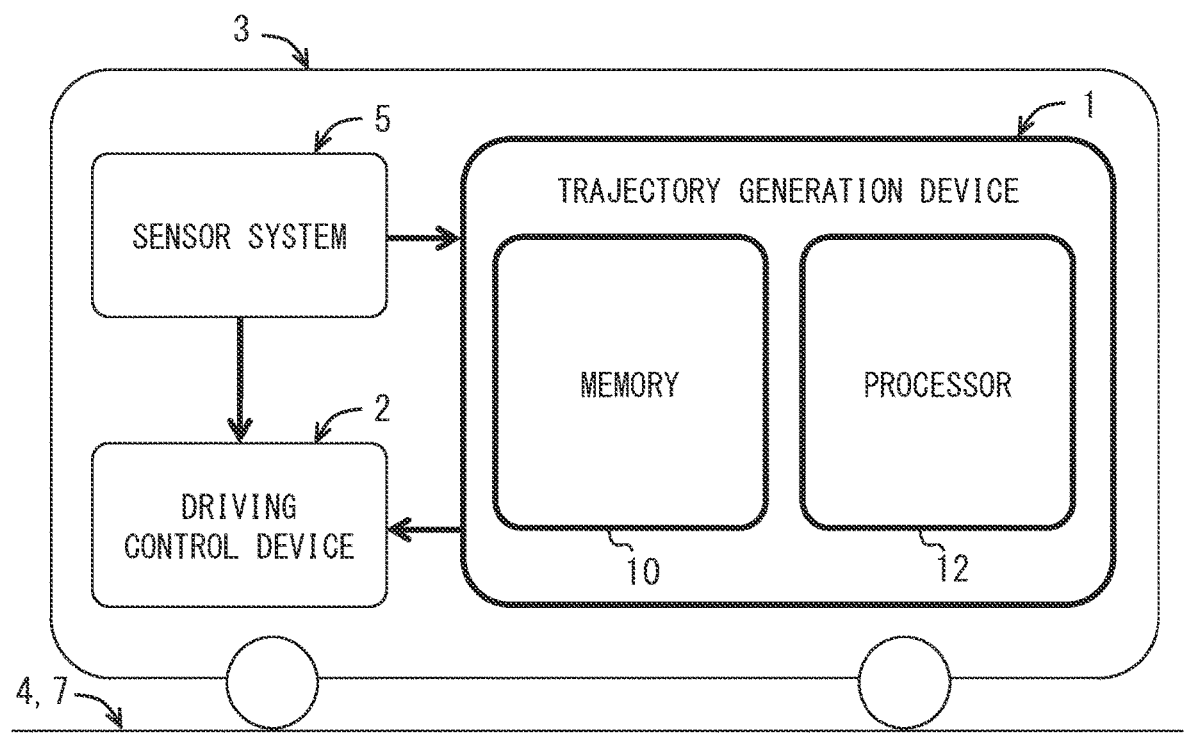
FIG. 1 is a block diagram showing an overall configuration of a trajectory generation device according to an embodiment.

A trajectory generation device 1 of the embodiment shown in FIG. 1 is configured to generate a trajectory X (see FIG. 2) for a future traveling of a vehicle 3 traveling in a traveling lane 4 of a traveling road 7. The trajectory generation device 1 is mounted on the vehicle 3 together with a driving control device 2. The driving control device 2 executes a driving control of the vehicle 3 to follow the trajectory X generated by the trajectory generation device 1. The vehicle 3 is, for example, an automatic driving vehicle or an advanced driving assistance vehicle that can autonomously travel constantly or temporarily by receiving the driving control of the driving control device 2. In the following description, a first vehicle on which the trajectory generation device 1 and the driving control device 2 are mounted is referred to as a subject vehicle 3. Further, in the following description, a second vehicle different from the subject vehicle 3 as the first vehicle is referred to as a target vehicle 6.

Figure 3:
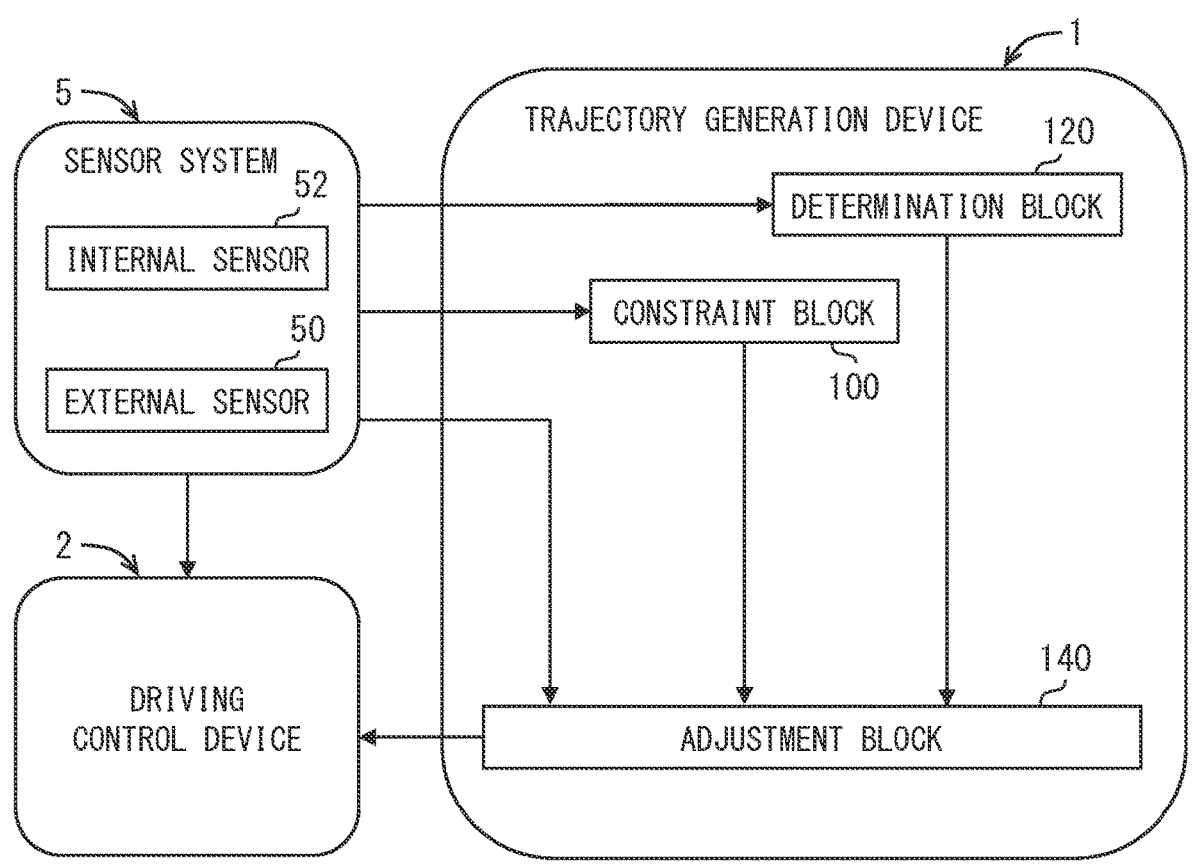
FIG. 3 is a block diagram showing a detailed configuration of a trajectory generation device according to the embodiment.

A sensor system 5 is mounted on the subject vehicle 3 in addition to the trajectory generation device 1 and the driving control device 2. The sensor system 5 acquires various kinds of information that can be utilized for the trajectory generation by the trajectory generation device 1 and for the driving control by the driving control device 2. As shown in FIG. 3, the sensor system 5 includes an external sensor 50 and an internal sensor 52.

The external sensor 50 generates information about the outside of the subject vehicle 3, which is the surrounding environment of the subject vehicle 3. The external sensor 50 may acquire the external information by detecting an object existing in the outside of the subject vehicle 3. The external sensor 50 of the detection type includes one or some of a camera, a LiDAR (Light Detection and Ranging/Laser Imaging Detection and Ranging), a radar, a sonar, and the like, for example. The external sensor 50 may acquire the external information by receiving a signal from an artificial satellite of a GNSS (Global Navigation Satellite System) disposed in the outside of the subject vehicle 3 or a signal from a roadside device of ITS (Intelligent Transport Systems). The external sensor 50 of the reception type is at least one of, for example, a GNSS receiver, a telematics receiver, and the like.

The internal sensor 52 generates information about the inside of the subject vehicle 3, which is the internal environment of the subject vehicle 3. The internal sensor 52 may generate the internal information by detecting a specific motion physical quantity in the inside of the subject vehicle 3. The detection type inside sensor 52 is, for example, at least one of a gyroscope, a traveling speed sensor, an acceleration sensor, a steering angle sensor, and the like.

Figure 2:
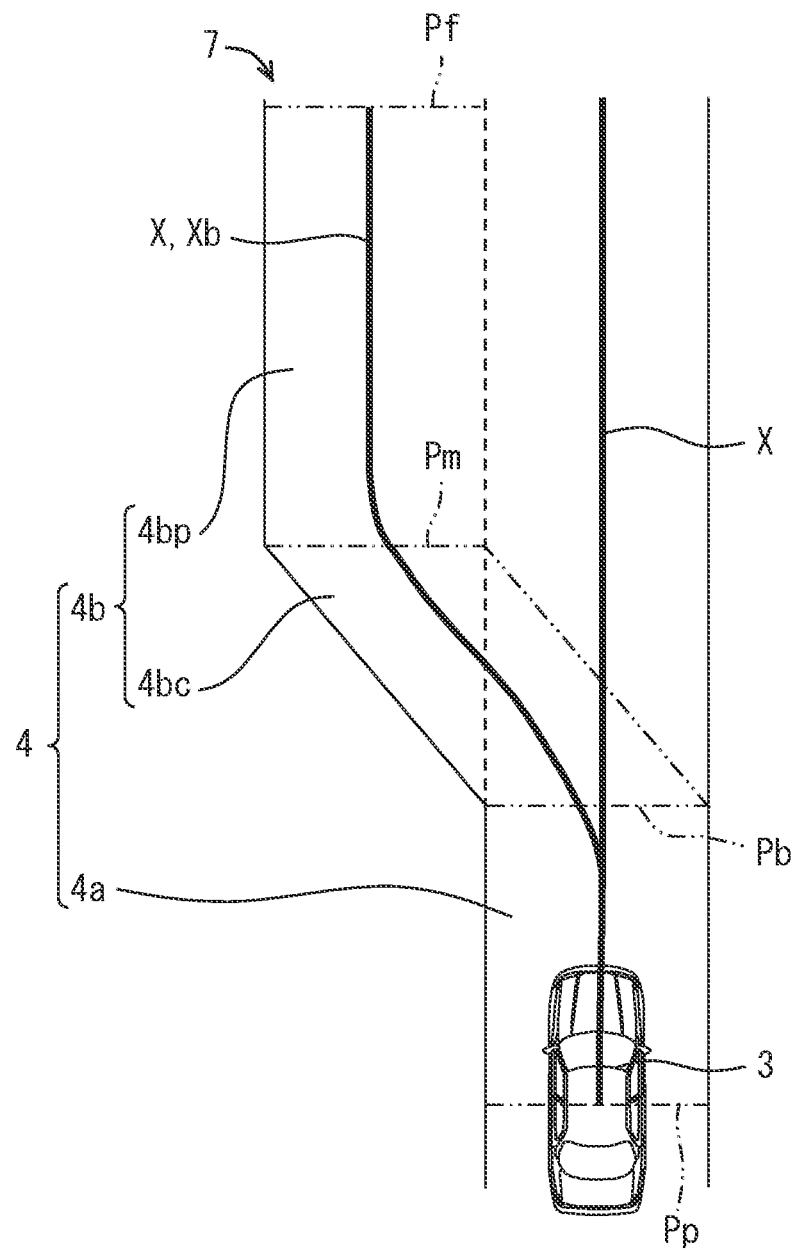
FIG. 2 is a schematic diagram for explaining a traveling trajectory generated by the trajectory generation device according to the embodiment.

Based on the acquired information of the sensor system 5, the trajectory X generated by the trajectory generation device 1 and output to the driving control device 2 defines the physical quantity of motion of the subject vehicle 3 in future travel in time series. As shown in FIG. 2, the trajectory X is generated for a trajectory generation section from a current position Pp to a future position Pf set route length ahead. The trajectory X defines a vector value or a scalar value of a specific motion physical quantity of the subject vehicle 3 at multiple points in the trajectory generation section. The motion physical quantity of the subject vehicle 3 defined by the trajectory X is at least one of a lateral position or a yaw angle relative to the traveling lane 4, a traveling speed, an acceleration, a travelling distance, a steering angle, and the like. The lateral position relative to the traveling path 4 is defined as the relative position from the center position in the lateral direction (width direction) of the traveling path 4, and is simply referred to as the lateral position in the following description.

The traveling scene where the trajectory generation device 1 generates the trajectory X includes a lane scene on the traveling road 7 with a main lane 4a and a branch lane 4b lined up as traveling lanes 4. In the lane change scene where the subject vehicle 3 changes lanes from the main 4a to the branch lane 4b, the trajectory X is defined as a branch trajectory Xb. The branch lane 4b includes a connection lane 4bc and a parallel lane 4bp. The connection lane 4bc is the traveling lane 4 branched from the main lane 4a and connects the main lane 4a to the parallel lane 4bp in a linear or curved shape. The parallel lane 4bp is the traveling lane 4 ahead of the connection lane 4bc. The parallel lane 4bp is connected to the main lane 4a through the connection lane 4bc and extends in parallel with the main lane 4a. In FIG. 2, the dashed double-dotted line with the sign Pb represents the imaginary branch part Pb where the connection lane 4bc branches off from the main lane 4a. In FIG. 2, the dashed double-dotted line with the sign Pm represents the imaginary transition part Pm where the traveling lane 4 transitions from the connection lane 4bc to the parallel lane 4bp.

The trajectory generation device 1 shown in FIG. 1 is composed of at least one dedicated computer. The dedicated computer of the trajectory generation device 1 may be an integrated ECU (Electronic Control Unit) integrating the advanced driver assistance or the automated driving of the subject vehicle 3. The dedicated computer of the trajectory generation device 1 may be an ECU of the locator used for the advanced driver assistance or the automated driving of the subject vehicle 3. The dedicated computer of the trajectory generation device 1 may be an ECU of the navigation device configured to navigate the driving of the subject vehicle 3. The dedicated computer included in the trajectory generation device 1 may be a communication ECU configured to control a communication between the subject vehicle 4 and an external device. These ECUs are connected to the driving control device 2 and the sensor system 5 via at least one of a LAN (Local Area Network), a wire harness, an internal bus, and the like. The dedicated computer of the trajectory generation device 1 may be a steering ECU used as the driving control device 2 to control at least the steering of the subject vehicle 3. The steering ECU 1 is connected to the sensor system 5 via at least one of a LAN, a wire harness, an internal bus, and the like.

The dedicated computer of the trajectory generation device 1 has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one of, for example, a CPU (Central Processing Unit), a GPU (Graphics Processing Unit), an RISC (Reduced Instruction Set Computer) CPU, and so on.

The processor 12 executes a plurality of instructions included in the trajectory generation program stored in the memory 10. Thereby, the trajectory generation device 1 establishes a plurality of functional blocks for generating the trajectory X. That is, in the trajectory generation device 1, the trajectory generation program stored in the memory 10 causes the processor 12 to execute a plurality of instructions in order to generate the trajectory X, and thus a plurality of functional blocks are built. The functional blocks build by the trajectory generation device 1 include, as shown in FIG. 3, a constraint block 100, a determination block 120, and an adjustment block 140.

Figure 4:
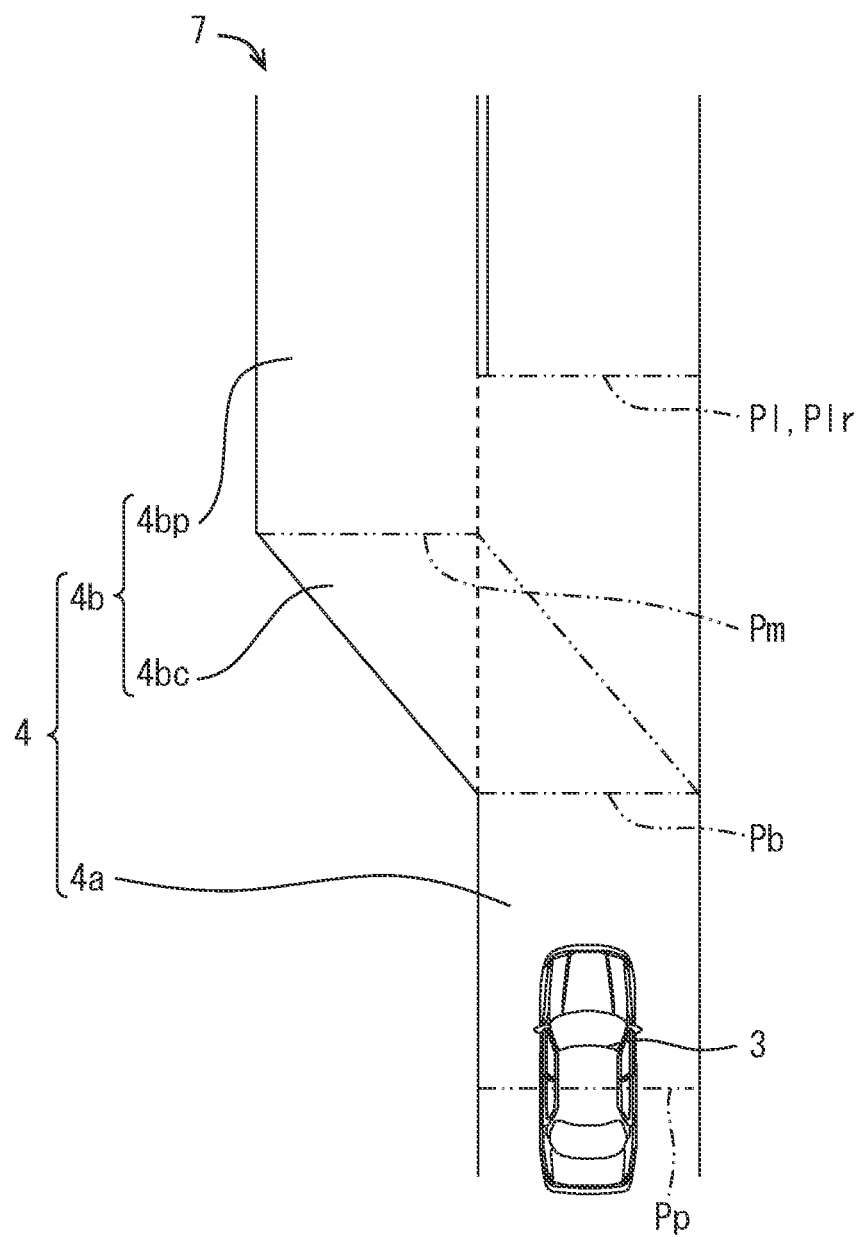
FIG. 4 is a schematic diagram for explaining a constraint according to the embodiment.
Figure 5:
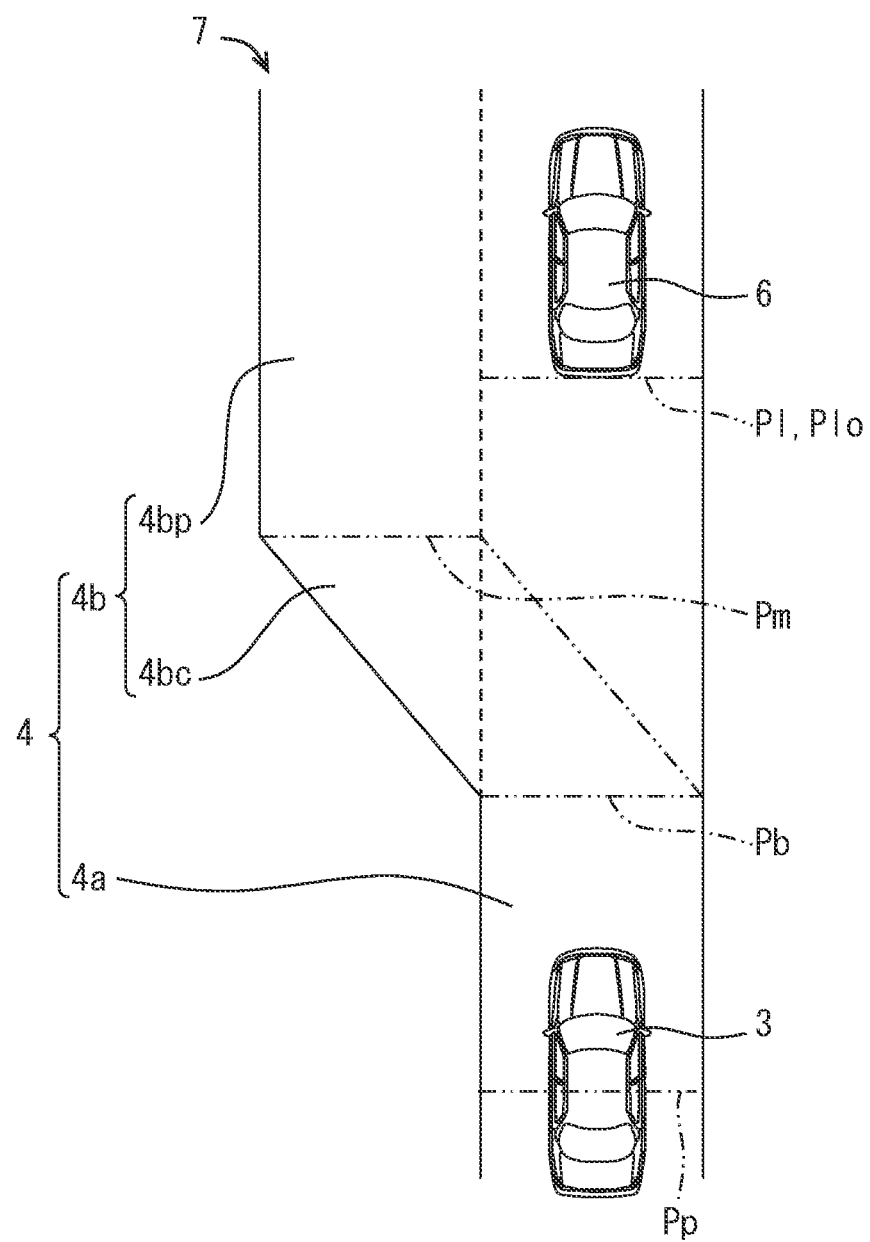
FIG. 5 is a schematic diagram for explaining a constraint according to the embodiment.

The constraint block 100 is configured to extract a constraint on the entry of the subject vehicle 3 from the main lane 4a into the branch lane 4b. Specifically, the constraint block 100 extracts the constraint when the branch part Pb from the main lane 4a to the branch lane 4b comes into the trajectory generation section, as shown in FIGS. 4, 5. That is, the constraint is extracted when the branch part Pb approaches to less than a set distance from the current position Pp of the subject vehicle 3. The extraction process here is performed based on at least the kinetic information of the target vehicle 6 of the external information acquired by the external sensor 50, and the map information related to the traveling lane 4 and the kinetic information of the subject vehicle 3 of the internal information acquired by the internal sensor 52.

The constraint contains at least an entrance limit position PI for the subject vehicle 3 entering from the main lane 4a into the branch lane 4b. The entrance limit position PI of the present embodiment is set as a closer one to the current position Pp of the subject vehicle 3 in a traveling limit position Plr which represent a boundary attribute between the main lane 4a and the branch lane 4b and an obstacle position Plo. As shown in FIG. 4, the traveling limit position Plr is a part of a constraint section and a start position (that is, the foremost position) of a regulated area where a lane change from the main lane 4a to the branch lane 4b is structurally or legally restricted. As shown in FIG. 5, the obstacle position Plo is a part of the constraint section and is a rear end of the target vehicle 6 which is traveling at the end of the line at a speed within an obstacle speed range that may interfere with the lane change of the subject vehicle 3 to the branch lane 4b. The constraint section is set from a part spaced away from the current position Pp of the subject vehicle 3 by the distance required for starting the driving of the subject vehicle 3 in the branch lane 4b in parallel with the main lane 4a after the lane change from the main lane 4a. The obstacle speed range, which is the traveling speed of the target vehicle 6 which interferes the lane change of the subject vehicle 3, is set in a range from zero to less than or equal to the set speed.

Figure 6:
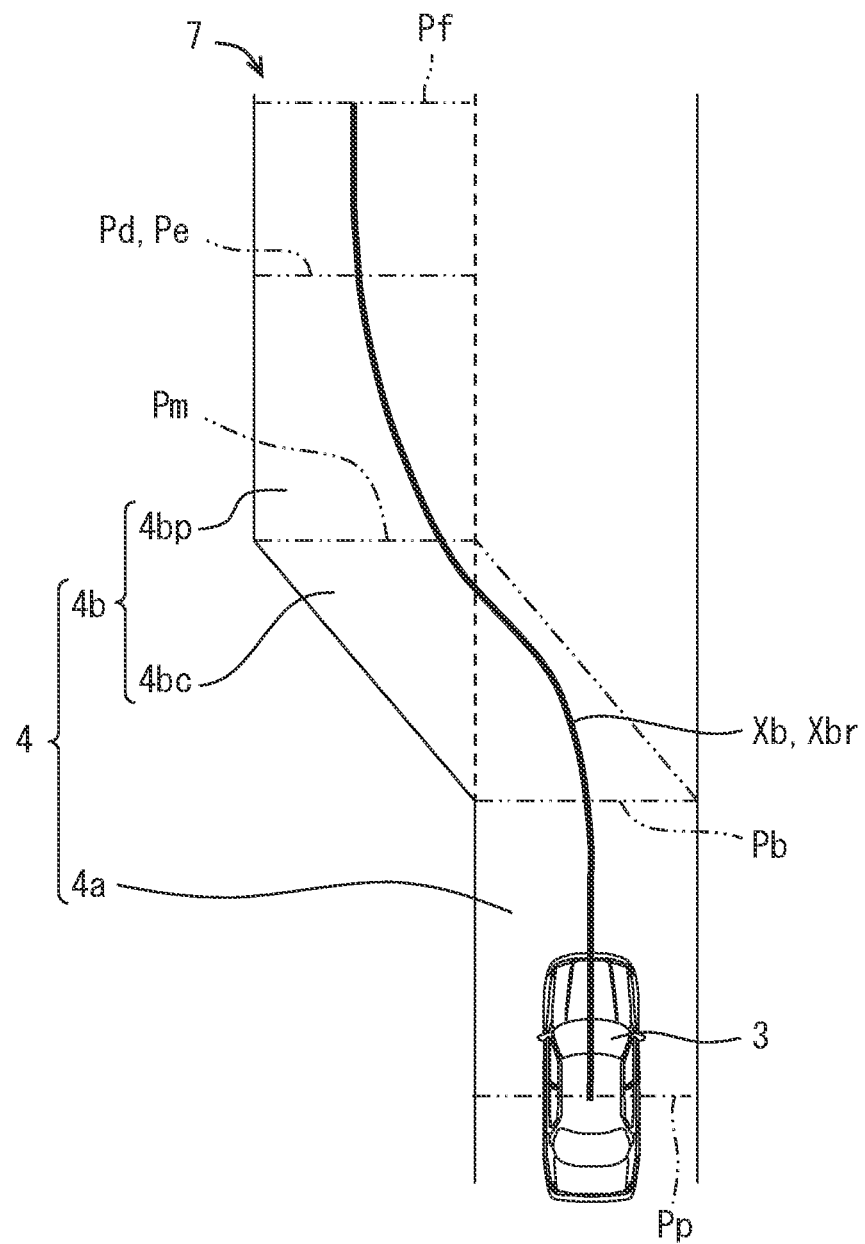
FIG. 6 is a schematic diagram for explaining a branch release trajectory according to the embodiment.
Figure 7:
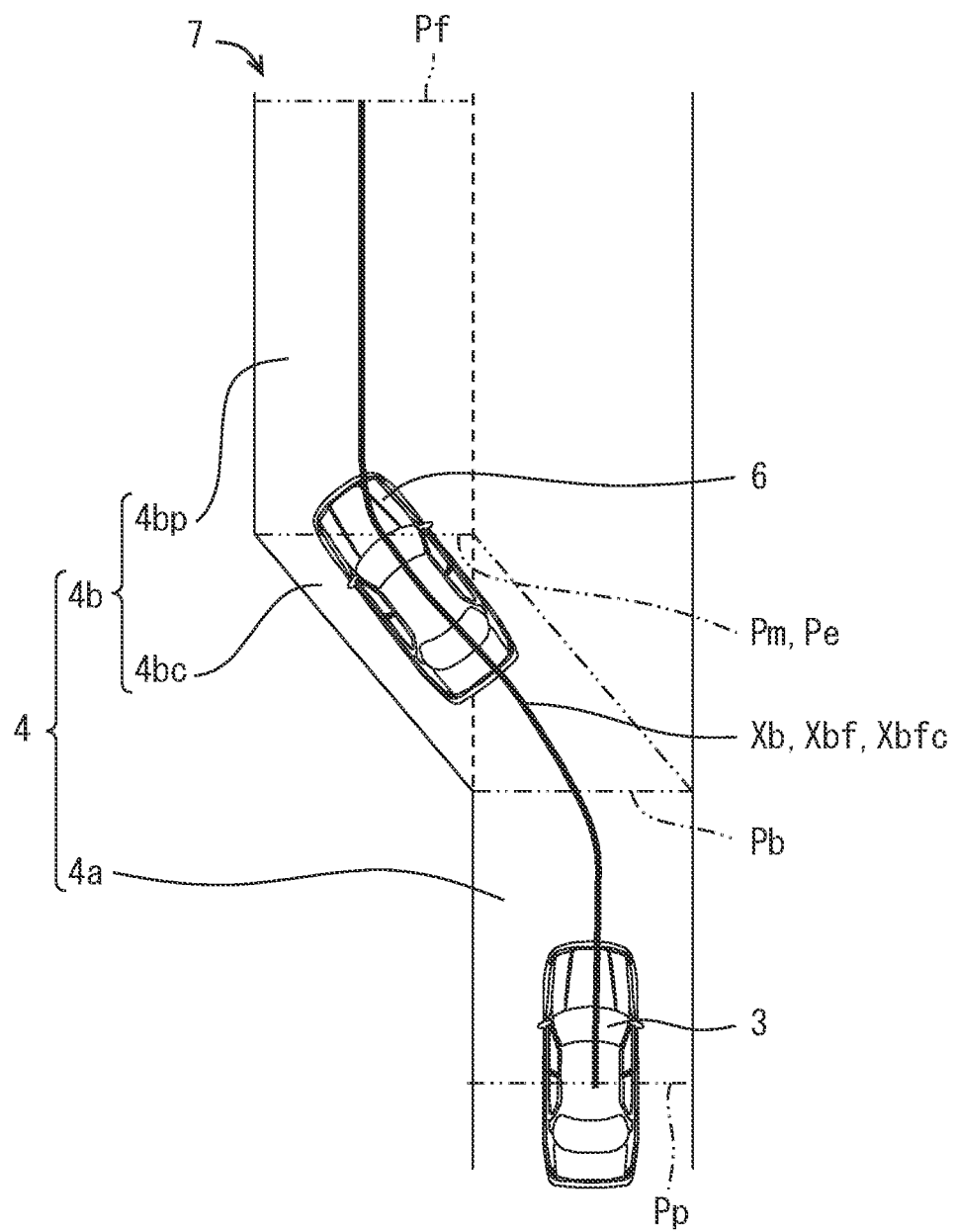
FIG. 7 is a schematic diagram for explaining a connection following trajectory of a branch following trajectory according to the embodiment.
Figure 8:
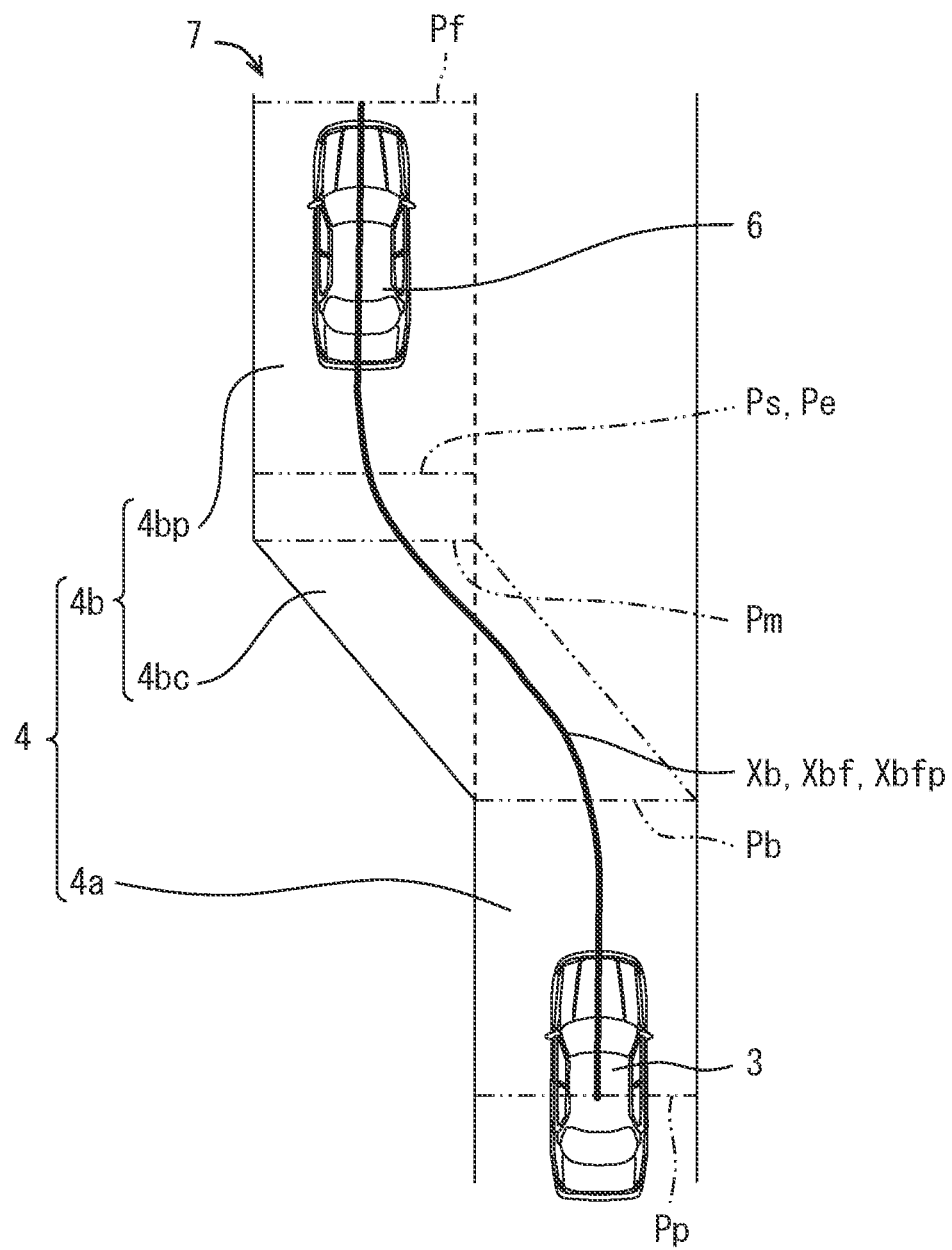
FIG. 8 is a schematic diagram for explaining a parallel following trajectory of the branch following trajectory according to the embodiment.

The determination block 120 shown in FIG. 3 is configured to determine whether the target vehicle 6 is present in the branch lane 4b. Specifically, the determination block 120 determines whether the target vehicle 6 is present in the branch lane 4b when the branch part Pb from the main lane 4a into the branch lane 4b comes into the trajectory generation section, as shown in FIG. 6-8. That is, it is determined whether the target vehicle 6 is present when the branch part Pb approaches to less than a set distance from the current position Pp of the subject vehicle 3. The determination process here is performed based on at least the kinetic information of the target vehicle 6 of the external information acquired by the external sensor 50, and the map information related to the traveling lane 4 and the kinetic information of the subject vehicle 3 of the internal information acquired by the internal sensor 52.

As shown in FIGS. 6, 8, when the target vehicle 6 is not present in the connection lane 4bc of the branch lane 4b, the determination block 120 determines that the target vehicle 6 is not present in the connection lane 4bc. In contrast, when the target vehicle 6 is traveling at the end of the line in the connection lane 4bc of the branch lane 4b at a speed within a reference speed range as shown in FIG. 7, the determination block 120 determines that the target vehicle 6 is present in the connection lane 4bc. However, when the speed of the target vehicle 6 traveling at the end in the connection lane 4bc of the branch lane 4b is outside the reference speed range, the determination block 120 determines that the target vehicle 6 is not present in the connection lane 4bc in the present embodiment.

The reference speed range which is a criterion for the determination of the presence of the target vehicle 4 in the connection lane 4bc is set in a range from zero to the set speed at which the subject vehicle 3 follows the target vehicle 4. According to this setting, it is determined whether the target vehicle 6 to which the subject vehicle 3 follows is present, and it is determined that the target vehicle 6 is not present when the speed of the target vehicle 6 is out of the reference speed range.

As shown in FIGS. 6, 7, when the rear end of the target vehicle 6 is not inside the determination area which is a part of the parallel lane 4bp of the branch lane 4b and starts from the transition part Pm, the determination block 120 determines that the target vehicle 6 is not present in the parallel lane 4bp. In contrast, when the rear end of the target vehicle 6, which is traveling inside the determination area and at the end of the of the line in the parallel lane 4bp of the branch lane 4b at a speed within the reference speed range, is inside the parallel lane 4bp, the determination block 120 determines that the target vehicle 6 is present in the parallel lane 4bp. However, when the speed of the target vehicle 6, whose rear end is in the parallel lane 4bp of the branch lane 4b, traveling at the end in the line is outside the reference speed range, the determination block 120 determines that the target vehicle 6 is not present in the parallel lane 4bp in the present embodiment. Further, when the rear end of the target vehicle 6 is in the parallel lane 4bp of the branch lane 4b but outside the determination area, the determination block 120 determines that the target vehicle 6 is not present in the parallel lane 4bp in the present embodiment.

The reference speed range which is a criterion for the determination of the presence of the target vehicle 4 in the parallel lane 4bp is set in a range from zero to the set speed at which the subject vehicle 3 follows the target vehicle 4. According to this setting, it is determined whether the target vehicle 6 to which the subject vehicle 3 follows is present, and it is determined that the target vehicle 6 is not present when the speed of the target vehicle 6 is out of the reference speed range. The set speed which defines the upper limit of the reference speed range for the determination of the presence in the parallel lane 4bp may be the same as or different from the set speed which defines the upper limit of the reference speed range for the determination of the presence in the connection lane 4bc.

The determination area set for determining whether the target vehicle 6 is present in the parallel lane 4bp is spaced from the transition part Pm by a distance required by the subject vehicle 3 for starting traveling in parallel with the main lane 4a after completing the lane change to the branch lane 4b. According to this setting, it is determined whether the target vehicle 6 to which the subject vehicle 3 follows until the subject vehicle 3 completes the lane change is present, and it is determined that the target vehicle 6 is not present when the target vehicle 6 is outside the determination area.

According to the above, the determination block 120 determines that the target vehicle 6 is not present in the branch lane 4b in the case shown in FIG. 6 where the determination block 120 determines that the target vehicle 6 is not present in the connection lane 4bc and the parallel lane 4bp. In contrast, the determination block 120 determines that the target vehicle 6 is present in the branch lane 4b in the cases shown in FIGS. 7, 8 where the target vehicle 120 determines that the target vehicle 6 is present in the connection lane 4bc or the parallel lane 4bp.

The adjustment block 140 shown in FIG. 3 is configured to adjust the sharpness of the branch trajectory generated as shown in FIGS. 6-8 based on the result of the determination by the determination block 120. Specifically, when it is determined that the target vehicle 6 is not present in the branch lane 4b, that is, when it is determined that the target vehicle 6 is not present in the connection lane 4bc and the parallel lane 4bp, the adjustment block 140 generates the trajectory Xbr of the branch trajectory Xb shown in FIG. 6. The trajectory Xbr is a branch release trajectory Xbr in which the subject vehicle 3 is released from following the target vehicle 6 in the branch lane 4b. In contrast, when it is determined that the target vehicle 6 is present in the branch lane 4b, that is, when it is determined that the target vehicle 6 is present in the connection lane 4bc or the parallel lane 4bp, the adjustment block 140 generates the trajectory Xbf of the branch trajectory Xb shown in FIGS. 7, 8. The trajectory Xbf is a branch following trajectory Xbf in which the subject vehicle 3 follows the target vehicle 6 in the branch lane 4b.

The branch following trajectory Xbf of the present embodiment includes two types. When it is determined that the target vehicle 6 is present in the connection lane 4bc, a connection following trajectory Xbf for causing the subject vehicle 3 to follow the target vehicle 6 in the connection lane 4bc is generated as the branch following trajectory Xbf as shown in FIG. 7 regardless of whether the target vehicle 6 is present in the parallel lane 4bp. In contrast, when it is determined that the target vehicle 6 is not present in the connection lane 4bc but is present in the parallel lane 4bp, a parallel following trajectory Xbfp for causing the subject vehicle 3 to follow the target vehicle 6 in the parallel lane 4bp as the branch following trajectory Xbf as shown in FIG. 8.

Figure 9:
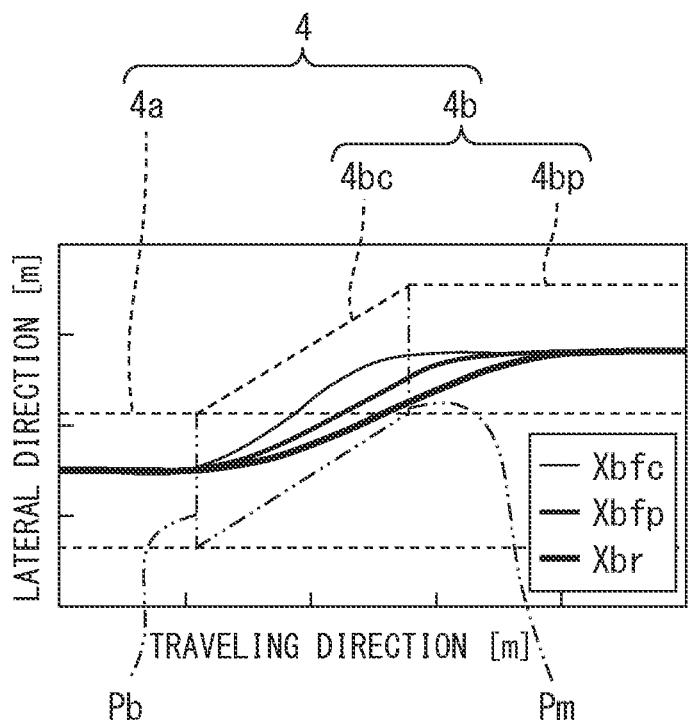
FIG. 9 is a schematic diagram for comparing branch trajectories according to the embodiment.

The adjustment block 140 is configured further generate the branch release trajectory Xbr for guiding the subject vehicle 3 from the main lane 4a to the branch lane 4b in a less sharp shape (i.e. more smooth shape) than the connection following trajectory Xbfc and the the parallel following trajectory Xbfp of the branch following trajectory Xbf as shown in FIGS. 6-9. That is, the connection following trajectory Xbfc and the parallel following trajectory Xbfp changes more sharply than the branch release trajectory Xbr. The adjustment block 140 generates the parallel following trajectory Xbp that guides the subject vehicle 3 from the main lane 4a to the branch lane 4b less sharply (i.e. more smoothly) than the connection following trajectory Xbfc as shown in FIG. 7-9. That is, the connection following trajectory Xbfc changes more sharply than the parallel following trajectory Xbfp.

The sharpness adjustment process of the branch trajectory Xb is performed based on at least the kinetic information of the target vehicle 6 of the external information acquired by the external sensor 50, and the map information related to the traveling lane 4 and the kinetic information of the subject vehicle 3 of the internal information acquired by the internal sensor 52. The constraint including the entrance limit position Pl extracted by the constraint block 100 is given to the trajectories Xbr, Xbfc, Xbfp.

The sharpness of the branch trajectory Xb may be adjusted based on a completion position Pe shown in FIG. 6-8 where the lane change of the subject vehicle 3 from the main lane 4a to the branch lane 4b is completed. The completion position Pe in a scene where it is determined that the target vehicle 6 not present in the connection lane 4bc and the parallel lane 4bp is set at a traveling start position Pd shown in FIG. 6 where the subject vehicle 3 starts traveling in the parallel lane 4bp in parallel with the main lane 4a. The traveling start position Pd is, for example, a position at which the subject vehicle 3 entirely faces the direction of the parallel lane 4bp after entering the parallel lane 4bp. In contrast, the completion position Pe in a scene where it is determined that the target vehicle 6 is present in the connection lane 4bc is set at the transition part Pm shown in FIG. 7 where the connection lane 4bc transitions to the parallel lane 4bp. The transition part Pm is, for example, a position of a link point represented by the map information. Further, the completion position Pe in a scene where it is determined that the target vehicle 6 is not present in the connection lane 4bc but present in the parallel lane 4bp is set at a following start position Ps shown in FIG. 8 where the subject vehicle 3 starts following the target vehicle 6 in the parallel lane 4bp. The following start position Ps is a position set in consideration with the lengths of the vehicles 3, 6 such that the subject vehicle 3 can follow the target vehicle 6.

Accordingly, the completion position Pe (i.e. the position Pd) of the branch release trajectory Xbr is farther from the branch part Pb than the completion positions Pe (i.e. the positions Pm, Ps) of the connection following trajectory Xbfc and the parallel following trajectory Xbfp, as shown in FIGS. 6-8. The completion position Pe (i.e. the position Ps) of the parallel following trajectory Xbfp is farther from the branch part Pb than the completion position Pe (i.e. the position Pm) of the connection following trajectory Xbfc. The branch trajectory Xb including the trajectories Xbr, Xbfc, Xbfp defines at least the lateral position by connecting the current position Pp of the subject vehicle 3 to the completion position Pe with at least one of straight lines and spline curves, for example.

Figure 10:
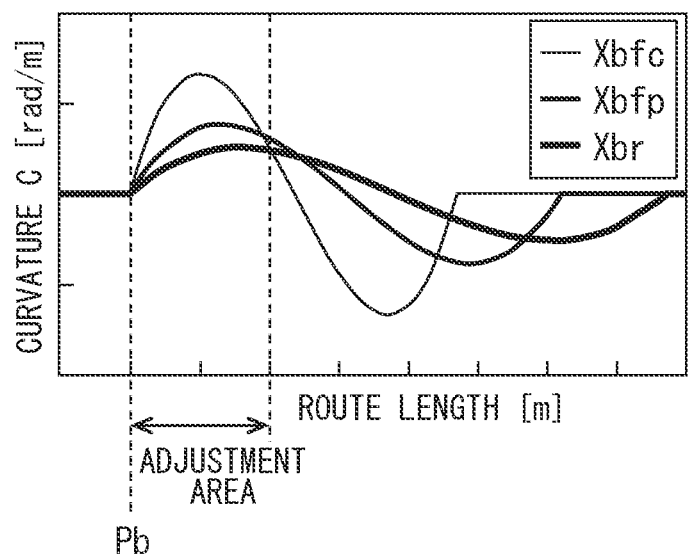
FIG. 10 is a graph for explaining an adjustment of a sharpness of the branch trajectory according to the embodiment.

The sharpness of the branch trajectory Xb may be adjusted using a curvature C of a curve drawn by the subject vehicle 3 entering from the main lane 4a into the branch lane 4b, as shown in FIG. 10. In an adjustment section from the branch part Pb, the curvature C of the branch release trajectory Xbr is smaller than the curvatures C of the connection following trajectory Xbfc and the parallel following trajectory Xbfp of the branch following trajectory Xbf. In the adjustment section, the curvature C of the parallel following trajectory Xbfp is smaller than the curvature C of the connection following trajectory Xbfc.

Figure 11:
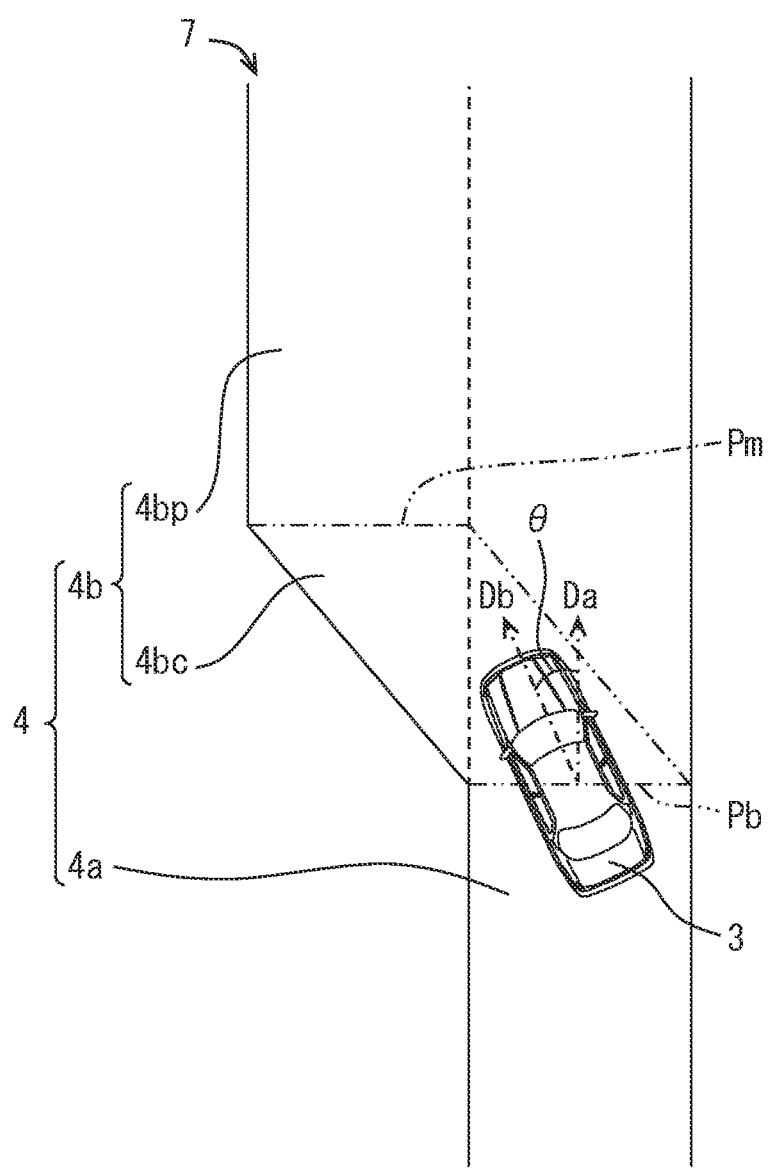
FIG. 11 is a schematic diagram for explaining an adjustment of a sharpness of the branch trajectory according to the embodiment.
Figure 12:
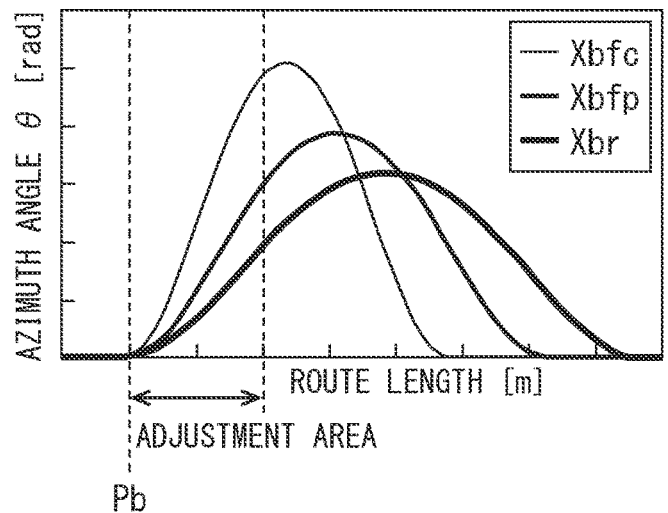
FIG. 12 is a graph for explaining an adjustment of a sharpness of the branch trajectory according to the embodiment.

The sharpness of the branch trajectory Xb may be adjusted using an azimuth angle θ, which is an angle between an entering direction db of the subject vehicle 3 in which the subject vehicle 3 enters from the main lane 4a into the branch lane 4b shown as shown in FIG. 11 and a lane direction Da of the main lane 4a, as shown in FIG. 12. In an adjustment section from the branch part Pb, the azimuth angle θ of the branch release trajectory Xbr is smaller than the azimuth angles θ of the connection following trajectory Xbfc and the parallel following trajectory Xbfp of the branch following trajectory Xbf. In the adjustment section, the azimuth angle θ of the parallel following trajectory Xbfp is smaller than the azimuth angle θ of the connection following trajectory Xbfc.

Figure 13:
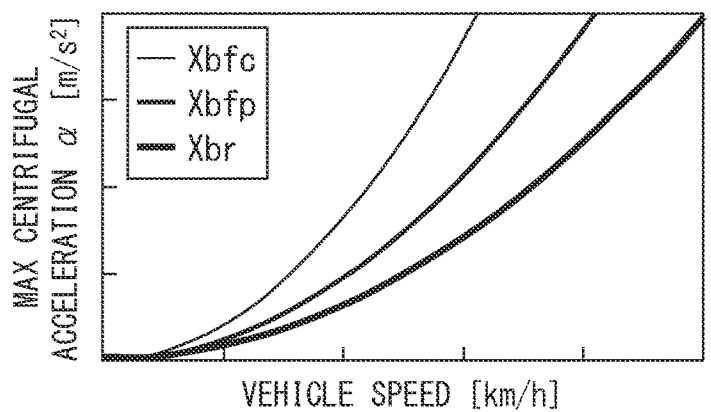
FIG. 13 is a graph for explaining an adjustment of a sharpness of the branch trajectory according to the embodiment.

The sharpness of the branch trajectory Xb may be adjusted using a maximum centrifugal acceleration α of the subject vehicle 3 entering from the main lane 4a into the branch lane 4b, as shown in FIG. 13. In an adjustment section from the branch part Pb, the maximum centrifugal acceleration α of the branch release trajectory Xbr is smaller than the maximum centrifugal accelerations a of the connection following trajectory Xbfc and the parallel following trajectory Xbfp of the branch following trajectory Xbf. In the adjustment section, the maximum centrifugal acceleration α of the parallel following trajectory Xbfp is smaller than the maximum centrifugal acceleration α of the connection following trajectory Xbfc. When the maximum centrifugal acceleration α is set to a smaller value, the ride comfort felt by passengers in the subject vehicle 3 tends to improve.

Figure 14:
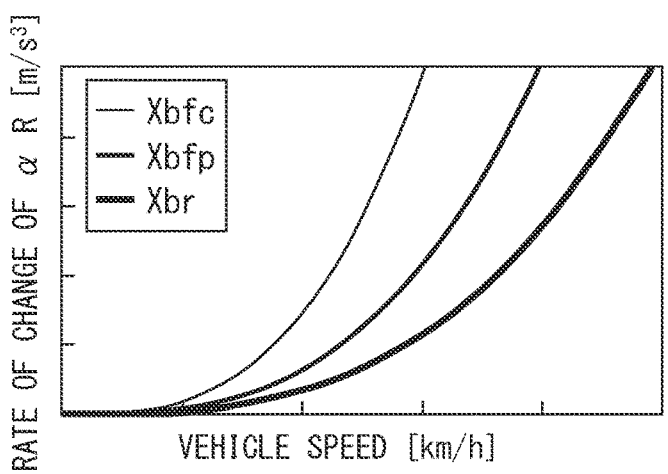
FIG. 14 is a graph for explaining an adjustment of a sharpness of the branch trajectory according to the embodiment.

The sharpness of the branch trajectory Xb may be adjusted using a rate of change R of the maximum centrifugal acceleration α of the subject vehicle 3 entering from the main lane 4a into the branch lane 4b, as shown in FIG. 14. In an adjustment section from the branch part Pb, the rate of change R of the branch release trajectory Xbr is smaller than the rate of changes R of the connection following trajectory Xbfc and the parallel following trajectory Xbfp of the branch following trajectory Xbf. In the adjustment section, the rate of change R of the parallel following trajectory Xbfp is smaller than the rate of change R of the connection following trajectory Xbfc. When the rate of change R is set to a smaller value, the ride comfort felt by passengers in the subject vehicle 3 tends to improve.

The trajectories Xbr, Xbfc, Xbfp are generated using at least one of the completion position Pe, the curvature C, the azimuth angle θ, the maximum centrifugal acceleration α, and the rate of change R for adjusting the sharpness of the branch trajectory Xb. The adjustment section in which the at least one value is used for generating the trajectory is spaced away from the branch part Pb by a route length required for adjusting the sharpness of the branch trajectory Xb.

The trajectories Xbr, Xbfc, Xbfp of the branch trajectory Xb whose sharpness is adjusted is input from the adjustment block 140 shown in FIG. 3 to the driving control device 2. The driving control device 2 controls at least the steering of the subject vehicle 3 according to the input trajectory Xbr, Xbfc, Xbfp. The control process is performed based on the external information acquired by the external sensor 50 and the internal information acquired by the internal sensor 52.

Figure 15:
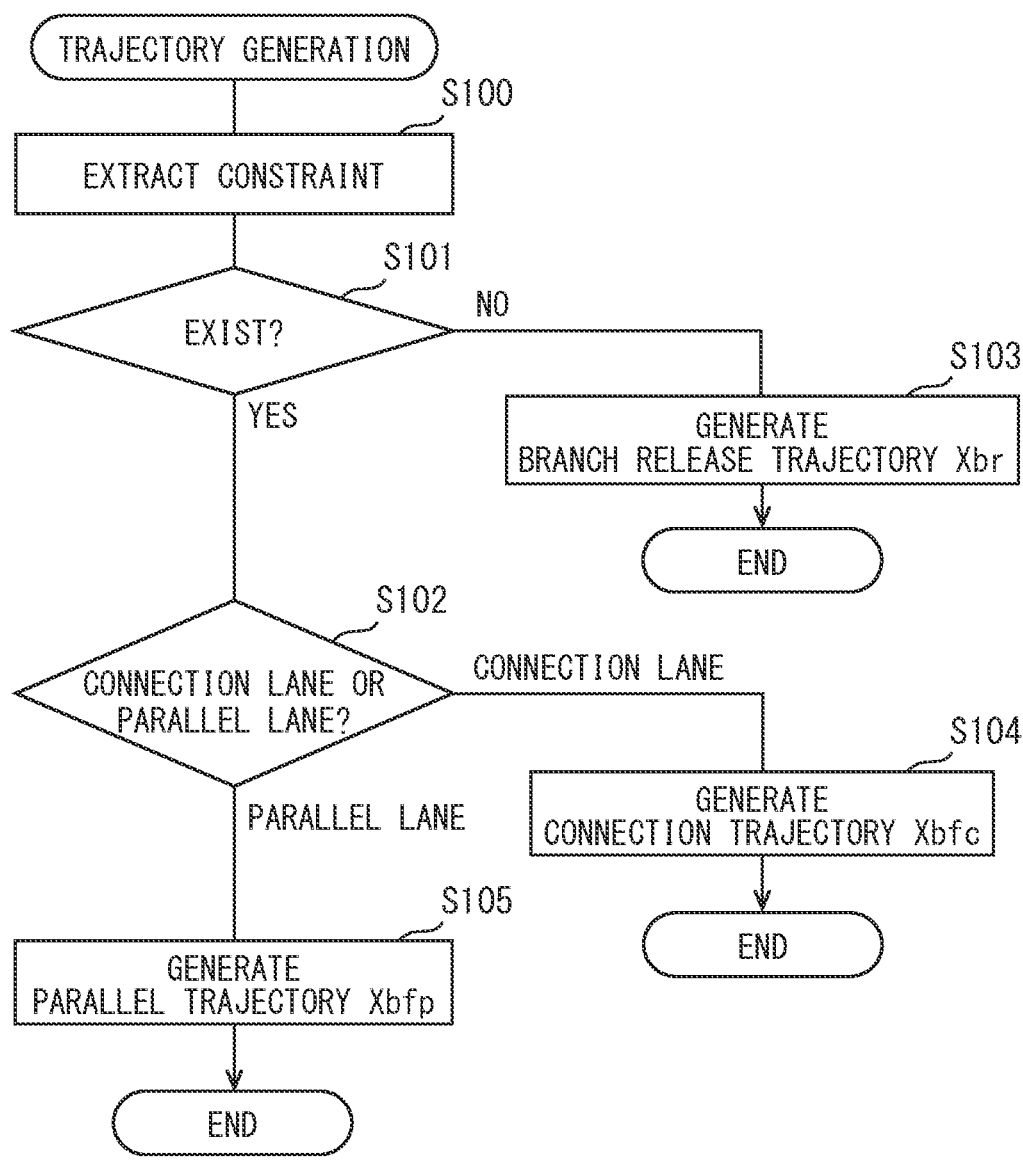
FIG. 15 is a flowchart illustrating a trajectory generating method according to the embodiment.

The flow of the trajectory generation method in which the trajectory generation device 1 generates the trajectory X in cooperation with the constraint block 100, the determination block 120, and the adjustment block 140 described above will be described below with reference to FIG. 15. This flow is started when the branch part Pb at which the branch lane 4b is branched from the main lane 4a comes into the trajectory generation section, i.e. when the distance between the current position Pp of the subject vehicle 3 and the branch part Pb becomes smaller than a set distance. Further, in this flow, "S" means steps of the process executed by instructions included in the trajectory generation program.

In S100, the constraint block 100 extracts a constraint on the entry of the subject vehicle 3 from the main lane 4a into the branch lane 4b. Specifically, the constraint block 100 extracts the constraint including at least the entrance limit position PI of the subject vehicle 3 entering from the main lane 4a into the branch lane 4b. Further, the constraint block 100 sets the entrance limit position PI at the closer one to the current position Pp of the subject vehicle 3 in the traveling limit position Plr and the obstacle position Plo.

In S101, the determination block 120 determines whether the target vehicle 6 is present in the branch lane 4b. When it is determined that the target vehicle 6 is not present in the branch lane 4b, i.t. when it is determined that the target vehicle 6 is not present in the connection lane 4bc and the parallel lane 4bp, the flow proceeds to S103. In contrast, when it is determined that the target vehicle 6 is present in the branch lane 4b, i.t. when it is determined that the target vehicle 6 is present in the connection lane 4bc or the parallel lane 4bp, the flow proceeds to S102.

In S102, the determination block 120 determines whether the target vehicle 6 is present in the connection lane 4bc or the parallel lane 4bp. The determination block 120 may determine whether the target vehicle 6 moves from the connection lane 4bc to the parallel lane 4bp based on whether the rear end of the target vehicle 6 reaches or passes the transition part Pm. When it is determined that the target vehicle 6 is present in the connection lane 4bc, the flow proceeds to S104. In contrast, when it is determined that the target vehicle 6 is present in the parallel lane 4bp, the flow proceeds to S105.

The adjustment block 140 performing S103, S104, S105 adjusts the sharpness of the generated branch trajectory Xb based on the determination result in S101, S102. Specifically, in S103, the adjustment block 140 generates the branch release trajectory Xbr as the branch trajectory Xb for releasing the subject vehicle 3 from the following the target vehicle 6 in the branch lane 4b. In S104, the adjustment block 140 generates the connection following trajectory Xbfc of the branch following trajectory Xbf as the branch trajectory Xb along which the subject vehicle 3 follows the target vehicle 6 in the connection lane 4bc of the branch lane 4b. In S105, the adjustment block 140 generates the parallel following trajectory Xbfp of the branch following trajectory Xbf as the branch trajectory Xb along which the subject vehicle 3 follows the target vehicle 6 in the parallel lane 4bp of the branch lane 4b.

The adjustment block 140 uses at least one of the completion position Pe, the curvature C, the azimuth angle θ, the maximum centrifugal acceleration α, and the rate of change R for adjusting the sharpness of the branch trajectory Xb to generate the trajectories Xbr, Xbfc, Xbfp in S103, S104, S105. The adjustment block 140 gives the constraint including the entrance limit position PI extracted in S100 to the trajectories Xbr, Xbfc, Xbfp.

Accordingly, in S103, the adjustment block 140 generates the branch release trajectory Xbr which change less sharply (more smoothly) than the connection following trajectory Xbfc and the parallel following trajectory Xbfp. In contrast, in S104, the adjustment block 140 generates the parallel following trajectory Xbfp which change less sharply than the connection following trajectory Xbfc and more sharply than the branch release trajectory Xbr. Further, in S105, the adjustment block 140 generates the connection following trajectory Xbfc which change more sharply than the parallel following trajectory Xbfp and the branch release trajectory Xbr. The trajectories are generated as described above, and then the flow ends.

In the present embodiment, the determination block 120 corresponds to a determination unit, the adjustment block 140 corresponds to an adjustment unit. Further, in the present embodiment, S101, S102 correspond to a determination process, and S103, S104, S105 correspond to an adjustment process.

(Operation Effects)

The operation and effects of the present embodiment described so far will be described below.

According to the present embodiment, the sharpness of the branch following trajectory Xbf and the branch release trajectory Xbr, which are the branch trajectory Xb of the subject vehicle 3 moving from the main lane 4*a* to the branch lane 4*b*, is adjusted based on whether the target vehicle 6 is present in the branch lane 4*b*. In a scene where it is determined that the target vehicle 6 is present in the branch lane 4*b*, the subject vehicle 3 follows the target vehicle 6 along the branch following trajectory Xbf, and accordingly the interference with the target vehicle 6 in the branch lane 4*b* can be suppressed. In contrast, in a scene where it is determined that the target vehicle 6 is not present in the branch lane 4*b*, the subject vehicle 3 is released from the following the target vehicle 6, and the change of the branch release trajectory Xbr in the lateral direction becomes smaller to guide the subject vehicle more smoothly than the branch following trajectory Xbf. Such small change in the lateral direction can suppress the occurrence of the lateral acceleration or the yaw rate in the behavior of the subject vehicle 3. Accordingly, the branch trajectory Xb suitable for the traveling scene of the subject vehicle 3 can be generated.

According to the present embodiment, in a scene where it is determined that the target vehicle 6 is present in the connection lane 4*bc* that connects the main lane 4*a* to the parallel lane 4*bp*, the following of the subject vehicle 3 to the target vehicle 6 is given priority by the connection following trajectory Xbfc as the branch following trajectory Xbf. Accordingly, the interference with the target vehicle 6 in the connection lane 4*bc* can be suppressed. In contrast, in a scene where it is determined that the target vehicle 6 is not present in the connection lane 4*bc*, the subject vehicle 3 is released from the following the target vehicle 6, and the change of the branch release trajectory Xbr in the lateral direction becomes smaller to guide the subject vehicle more smoothly than the connection following trajectory Xbfc. Such small change in the lateral direction can suppress the occurrence of the lateral acceleration or the yaw rate in the behavior of the subject vehicle 3. Accordingly, suitable branch following trajectory Xb can be generated for each scene based on the determination whether the target vehicle 6 is present in the connection lane 4*bc*.

According to the present embodiment, in a scene where it is determined that the target vehicle 6 is not present in the connection lane 4*bc* and is present in the parallel lane 4*bp*, the change in the lateral direction of the parallel following trajectory Xbfp, which guides the subject vehicle 3 less sharply than the connection following trajectory Xbfc and causes the subject vehicle 3 to follow the target vehicle 6, is smaller than that of the connection following trajectory Xbfc. Accordingly, the parallel following trajectory Xbfp can suppress the interference with the target vehicle 6 in the parallel lane 4*bp* and the occurrence of the lateral acceleration or the yaw rate in the connection lane 4*bc*. Accordingly, suitable branch following trajectory Xb can be generated for each scene based on the determination whether the target vehicle 6 is present in the connection lane 4*bc* and the parallel lane 4*bp*.

The branch release trajectory Xbr according to the present embodiment guides the subject vehicle 3 to the branch lane 4*b* less sharply than the parallel following trajectory Xbfp. Accordingly, the parallel following trajectory Xbfp that guides the subject vehicle 3 more sharply than the branch release trajectory Xbr gives higher reliability in the following of the subject vehicle 3 to the target vehicle 6 even when the change in the lateral direction is small. Accordingly, even when the lateral acceleration or the yaw rate in the connection lane 4*bc* is suppressed, the interference with the target vehicle 6 in the parallel lane 4*bp* can be suppressed more effectively. Accordingly, optimal branch following trajectory Xb can be generated for each scene based on the determination whether the target vehicle 6 is present in the connection lane 4*bc* and the parallel lane 4*bp*.

According to the present embodiment, the completion position Pe at which the lane change of the subject vehicle 3 to the branch lane 4*b* includes the position Pd where the subject vehicle 3 starts traveling in the parallel lane 4*bp* in parallel with the main lane 4*a* in a scene where it is determined that the target vehicle 6 is not present in the connection lane 4*bc* and the parallel lane 4*bp*. Further, the completion position Pe includes the position Pm where the connection lane 4*bc* transitions to the parallel lane 4*bp* in a scene where it is determined that the target vehicle 6 is present in the connection lane 4*bc*. Further, the completion position Pe in a scene where it is determined that the target vehicle 6 is not present in the connection lane 4*bc* but present in the parallel lane 4*bp* includes the position Ps where the subject vehicle 3 starts following the target vehicle 6 in the parallel lane 4*bp*. Accordingly, the sharpness is given to the branch trajectory Xb suitable to each scene by the completion position Pe. Accordingly, the branch trajectory Xb suitable for the traveling scene of the subject vehicle 3 can be generated.

According to the present embodiment, the curvature C of the curve drawn by the subject vehicle 3 entering the branch lane 4*b* gives the branch trajectory Xb the sharpness suitable for the traveling scene. Accordingly, the branch trajectory Xb suitable for the traveling scene of the subject vehicle 3 can be generated.

According to the present embodiment, the azimuth angle θ between the direction of the main lane 4*a* and the entering direction db of the subject vehicle 3 entering the branch lane 4*b* gives the sharpness suitable for the traveling scene. Accordingly, the branch trajectory Xb suitable for the traveling scene of the subject vehicle 3 can be generated.

According to the present embodiment, the maximum centrifugal acceleration α of the subject vehicle 3 entering the branch lane 4*b* gives the branch trajectory Xb the sharpness suitable for the traveling scene. Accordingly, the branch trajectory Xb suitable for the traveling scene of the subject vehicle 3 can be generated.

According to the present embodiment, the rate of change of the maximum centrifugal acceleration α of the subject vehicle 3 entering the branch lane 4*b* gives the branch trajectory Xb the sharpness suitable for the traveling scene. Accordingly, the branch trajectory Xb suitable for the traveling scene of the subject vehicle 3 can be generated.

According to the present embodiment, the sharpness of the branch lane Xb is adjusted under the constraint that is the entrance limit position PI of the subject vehicle 3 entering the branch lane 4*b*. Accordingly, the reliability of the branch trajectory Xb suitable for the traveling scene of the subject vehicle 3 can be improved.

Other Embodiments

Although one embodiment has been described, the present disclosure should not be limited to the above embodiment and may be applied to various other embodiments within the scope of the present disclosure.

The dedicated computer of the trajectory generation device 1 in a modification example may be at least one outside center computer communicating with the subject vehicle 3. In this case, a traveling path P may be planned by the outside center computer of the trajectory generation device 1 and instructed to the subject vehicle 3.

The dedicated computer of the trajectory generation device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In a modification example, S100 performed by the constraint block 100 may be omitted. In a modification example, S101, S102 performed by the determination block 120 may be determine whether the target vehicle 6 is present in the connection lane 4*bc* and the parallel lane 4*bp* based on future positions of the subject vehicle 3 and the target vehicle 6 instead of the traveling speed of the target vehicle 6.

Figure 16:
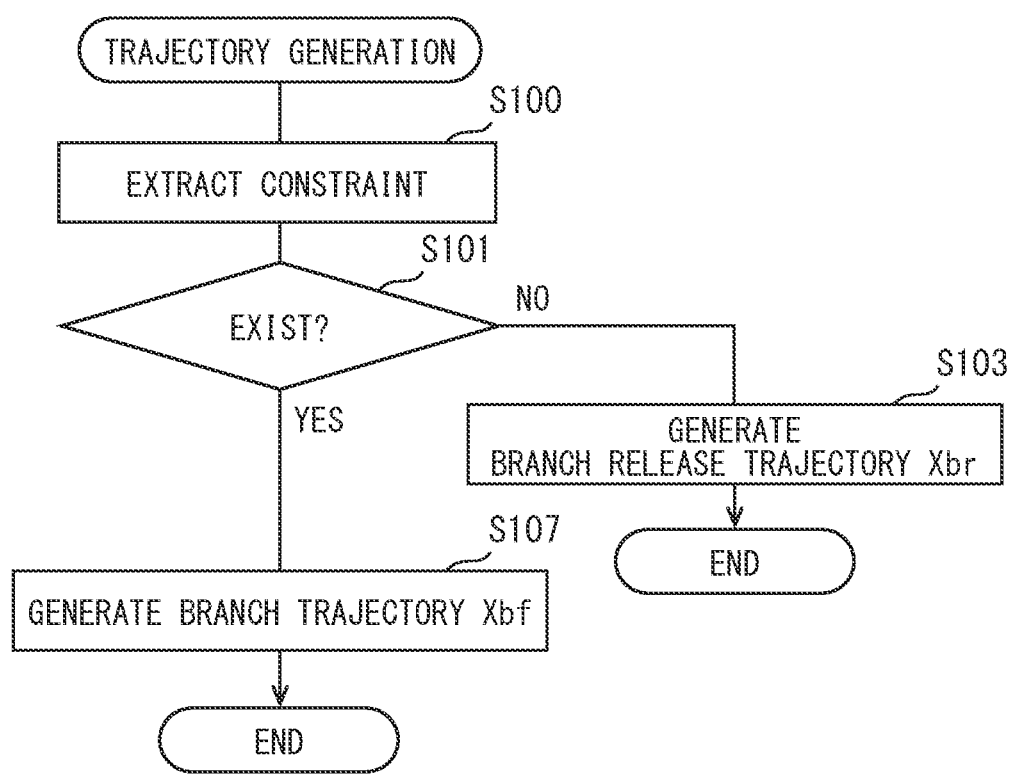
FIG. 16 is a flowchart illustrating a trajectory generating method according to a modification example.

In a modification example, in S101 performed by the determination block 120, the presence of the target vehicle 6 in the branch lane 4*b* may be determined without distinguishing between the parallel lane 4*bp* and the connection lane 4*bc*. In this modification example, S102 performed by the determination block 120 may be omitted as shown in FIG. 16. In this modification example, S104, S105 performed by the adjustment block 140 may be replaced by S107 shown in FIG. 16. In S107 of this modification example, the adjustment block 140 generates the branch following trajectory Xbf that changes more sharply than the branch release trajectory Xbr. Accordingly, in S103 of this modification example, the adjustment block 140 generates the branch release trajectory Xbr that changes less sharply (i.e. more smoothly) than the branch following trajectory Xbf.

Figure 17:
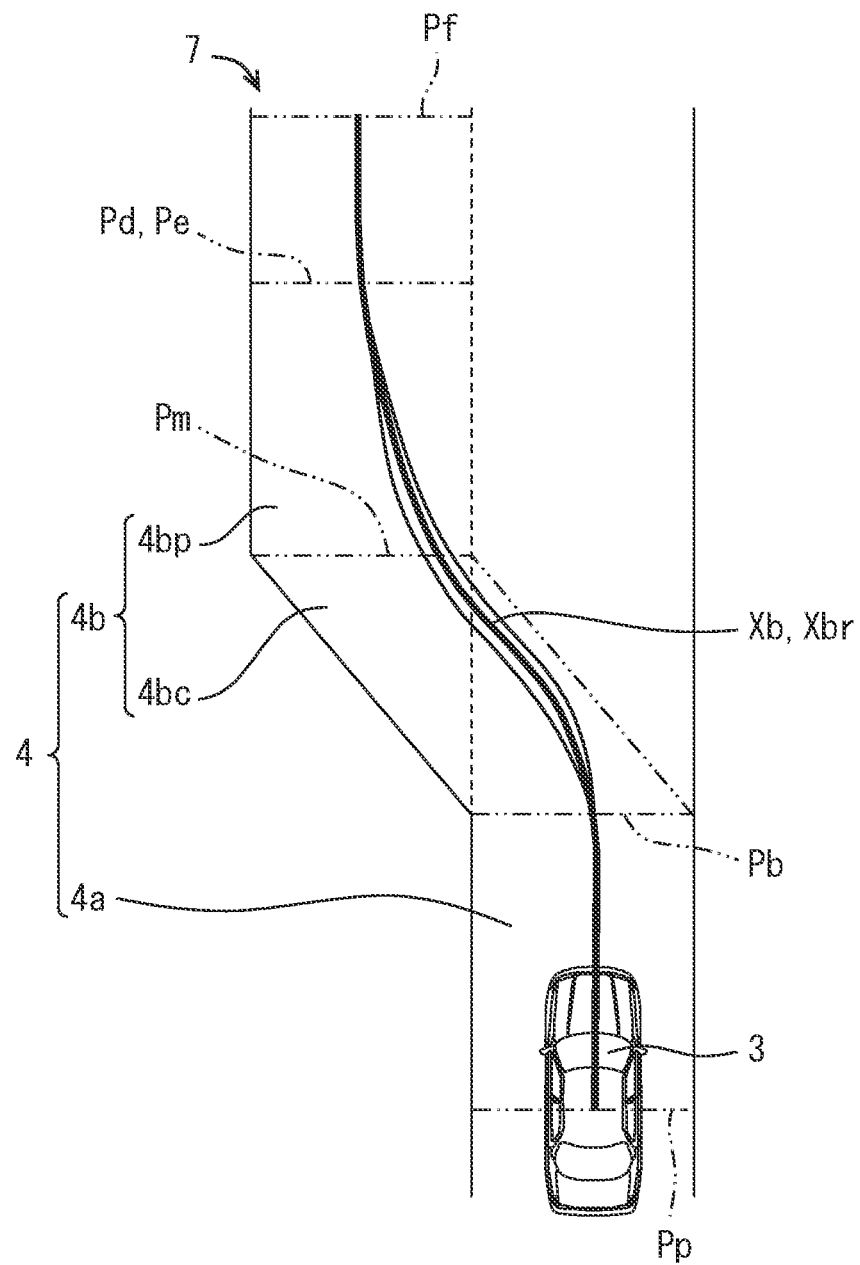
FIG. 17 is a schematic diagram for explaining the generation of the branch trajectory according to a modification example.

In S103, S104, S105 performed by the adjustment block 140 of the modification example, the trajectory Xbr, Xbfc, Xbfp may be selected after the trajectories Xbr, Xbfc, Xbfp are generated as the branch trajectory Xb as shown in FIG. 17. In FIG. 17, the candidate trajectories are illustrated by thin solid lines, and the selected trajectory is illustrated as a thick solid line. In S103, S105 performed by the adjustment block 140 of the modification example, the sharpness of the branch release trajectory Xbr and the parallel following trajectory Xbfp may be adjusted to be substantially the same. In S104, S105 performed by the adjustment block 140 of the modification example, the sharpness of the connection following trajectory Xbfc and the parallel following trajectory Xbfp may be adjusted to be substantially the same.

What is claimed is:

1. A trajectory generation device configured to generate a branch trajectory as a trajectory of a first vehicle traveling from a main lane to a branch lane while the first vehicle is following a second vehicle in the main lane, the trajectory generation device comprising:
a determination unit configured to determine whether the second vehicle different from the first vehicle is present in the branch lane or the main lane; and
an adjustment unit configured to adjust a sharpness of the branch trajectory based on whether the second vehicle is present in the branch lane, wherein the branch trajectory generated in a scene where it is determined that the second vehicle is present in the branch lane is a branch following trajectory in which the first vehicle is traveling in a state of following the second vehicle,
the branch trajectory generated in a scene where it is determined that the second vehicle is present in the main lane is a branch release trajectory in which the first vehicle is released from the state of following to the second vehicle, and
the adjustment unit is configured to generate the branch release trajectory that guides the first vehicle to the branch lane less sharply than the branch following trajectory, and
wherein
the branch release trajectory is configured to have a smaller azimuth angle between a direction of the main lane and a traveling direction of the first vehicle entering the branch lane than the branch following trajectory, and
the first vehicle is capable of performing autonomous driving constantly or temporarily by receiving a driving control of a driving control device, and
the driving control device controls at least steering of the first vehicle according to the generated branch release trajectory or the generated branch following trajectory.

2. The trajectory generation device according to claim 1, wherein the branch lane includes a parallel lane that is parallel to the main lane and a connection lane that connects the main lane to the parallel lane,
the branch following trajectory generated in a scene where it is determined that the second vehicle is present in the connection lane is a connection following trajectory, and
the adjustment unit is configured to generate the branch release trajectory that guides the first vehicle to the branch lane less sharply than the connection following trajectory.

3. The trajectory generation device according to claim 2, wherein the branch following trajectory generated in a scene where it is determined that the second vehicle is not present in the connection lane and is present in the parallel lane is a parallel following trajectory, and
the adjustment unit is configured to generate the parallel following trajectory that guides the first vehicle to the branch lane less sharply than the connection following trajectory.

4. The trajectory generation device according to claim 3, wherein
the adjustment unit is configured to generate the branch release trajectory that guides the first vehicle to the branch lane less sharply than the parallel following trajectory.

5. The trajectory generation device according to claim 3, wherein
the adjustment unit is configured to adjust the sharpness by a completion position at which a lane change of the first vehicle to the branch lane is completed, and the completion position is
- a position at which the first vehicle starts traveling in parallel with the main lane in the parallel lane in a scene where it is determined that the second vehicle is not present in the connection lane and the parallel lane,
- a position at which the connection lane transitions to the parallel lane in a scene where it is determined that the second vehicle is present in the connection lane, and
- a position at which the first vehicle starts following the second vehicle in the parallel lane in a scene where it is determined that the second vehicle is not present in the connection lane and is present in the parallel lane.

6. The trajectory generation device according to claim 1, wherein
the adjustment unit is configured to adjust the sharpness of the branch trajectory by a curvature of a curve drawn by the first vehicle entering the branch lane.

7. The trajectory generation device according to claim 1, wherein
the adjustment unit is configured to adjust a sharpness of the branch trajectory by an azimuth angle between a direction of the main lane and a traveling direction of the first vehicle entering the branch lane.

8. The trajectory generation device according to claim 1, wherein the adjustment unit is configured to adjust a sharpness of the branch trajectory by a maximum centrifugal acceleration of the first vehicle entering the branch lane.

9. The trajectory generation device according to claim 1, wherein
the adjustment unit is configured to adjust a sharpness of the branch trajectory by a rate of change of a maximum centrifugal acceleration of the first vehicle entering the branch lane.

10. The trajectory generation device according to claim 1, wherein
the adjustment unit is configured to give, as a constraint to the branch trajectory, an entrance limit position of the first vehicle entering the branch lane.

11. A method for a processor to generate a branch trajectory as a trajectory of a first vehicle traveling from a main lane to a branch lane while the first vehicle is following a second vehicle in the main lane, the method comprising:
determining whether the second vehicle is present in the branch lane or the main lane; and
adjusting a sharpness of the branch trajectory based on whether the second vehicle is present in the branch lane, wherein
the branch trajectory generated in a scene where it is determined that the second vehicle is present in the branch lane is a branch following trajectory in which the first vehicle is traveling in a state of following the second vehicle,
the branch trajectory generated in a scene where it is determined that the second vehicle is present in the main lane is a branch release trajectory in which the first vehicle is released from the state of following to the second vehicle, and
the branch release trajectory guides the first vehicle to the branch lane less sharply than the branch following trajectory, and
wherein
the branch release trajectory is configured to have a smaller azimuth angle between a direction of the main lane and a traveling direction of the first vehicle entering the branch lane than the branch following trajectory, and
the first vehicle is capable of performing autonomous driving constantly or temporarily by receiving a driving control of a driving control device, and
the driving control device controls at least steering of the first vehicle according to the generated branch release trajectory or the generated branch following trajectory.

12. The method according to claim 11, wherein
the branch lane includes a parallel lane that is parallel to the main lane and a connection lane that connects the main lane to the parallel lane,
the branch following trajectory in a scene where it is determined that the second vehicle is present in the connection lane is a connection following trajectory, and
the branch release trajectory guides the first vehicle to the branch lane less sharply than the connection following trajectory.

13. The method according to claim 12, wherein
the branch following trajectory in a scene where it is determined that the second vehicle is not present in the connection lane and is present in the parallel lane is a parallel following trajectory, and
the parallel following trajectory guides the first vehicle to the branch lane less sharply than the connection following trajectory.

14. The method according to claim 13, wherein
the branch release trajectory guides the first vehicle to the branch lane less sharply than the parallel following trajectory.

15. The method according to claim 13, wherein
in the adjusting the sharpness, the sharpness is adjusted by a completion position at which a lane change of the first vehicle to the branch lane is completed, and
the completion position is
- a position at which the first vehicle starts traveling in parallel with the main lane in the parallel lane in a scene where it is determined that the second vehicle is not present in the connection lane and the parallel lane,
- a position at which the connection lane transitions to the parallel lane in a scene where it is determined that the second vehicle is present in the connection lane, and
- a position at which the first vehicle starts following the second vehicle in the parallel lane in a scene where it is determined that the second vehicle is not present in the connection lane and is present in the parallel lane.

16. The method according to claim 11, wherein
in the adjusting the sharpness, the sharpness of the branch trajectory is adjusted by a curvature of a curve drawn by the first vehicle entering the branch lane.

17. The method according to claim 11, wherein in the adjusting the sharpness, the sharpness of the branch trajectory is adjusted by an azimuth angle between a direction of the main lane and a traveling direction of the first vehicle entering the branch lane.

18. The method according to claim 11, wherein
in the adjusting the sharpness, the sharpness of the branch trajectory is adjusted by a maximum centrifugal acceleration of the first vehicle entering the branch lane.

19. The method according to claim 11, wherein
in the adjusting the sharpness, the sharpness of the branch trajectory is adjusted by a rate of change of a maximum centrifugal acceleration of the first vehicle entering the branch lane.

20. The method according to claim 11, wherein
in the adjusting the sharpness, an entrance limit position of the first vehicle entering the branch lane is given to the branch trajectory as a constraint.

21. A computer program product for generating a branch trajectory as a trajectory of a first vehicle traveling from a main lane to a branch lane while the first vehicle is following a second vehicle in the main lane, the computer program product being stored on at least one non-transitory computer readable medium and comprising instructions configured to, when executed by at least one processor, cause the at least one processor to:
  determine whether the second vehicle is present in the branch lane or the main lane; and
  adjust a sharpness of the branch trajectory based on whether the second vehicle is present in the branch lane, wherein
  the branch trajectory generated in a scene where it is determined that the second vehicle is present in the branch lane is a branch following trajectory in which the first vehicle is traveling in a state of following the second vehicle,
  the branch trajectory generated in a scene where it is determined that the second vehicle is present in the main lane is a branch release trajectory in which the first vehicle is released from the state of following the second vehicle, and
  the branch release trajectory guides the first vehicle to the branch lane less sharply than the branch following trajectory, and
wherein
  the branch release trajectory is configured to have a smaller azimuth angle between a direction of the main lane and a traveling direction of the first vehicle entering the branch lane than the branch following trajectory, and
  the first vehicle is capable of performing autonomous driving constantly or temporarily by receiving a driving control of a driving control device, and
  the driving control device controls at least steering of the first vehicle according to the generated branch release trajectory or the generated branch following trajectory.

22. The trajectory generation device according to claim 1, wherein
  the branch release trajectory is configured to provide a lower lateral acceleration than the branch following trajectory.

* * * * *